(12) United States Patent
Kray et al.

(10) Patent No.: US 11,519,278 B2
(45) Date of Patent: Dec. 6, 2022

(54) ROTOR BLADE RETENTION SYSTEM FOR A GAS TURBINE ENGINE

(71) Applicant: General Electric Company, Schenectady, NY (US)

(72) Inventors: Nicholas Joseph Kray, Mason, OH (US); Elzbieta Kryj-Kos, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/193,064

(22) Filed: Mar. 5, 2021

(65) Prior Publication Data
US 2022/0282626 A1 Sep. 8, 2022

(51) Int. Cl.
*F01D 5/30* (2006.01)
*F02C 7/047* (2006.01)
*F01D 25/02* (2006.01)
*F04D 29/58* (2006.01)
*F01D 5/32* (2006.01)
*B64D 33/02* (2006.01)

(52) U.S. Cl.
CPC .......... *F01D 5/3007* (2013.01); *F01D 25/02* (2013.01); *F02C 7/047* (2013.01); *F04D 29/584* (2013.01); *F04D 29/5853* (2013.01); *B64D 2033/0233* (2013.01); *F01D 5/323* (2013.01); *F05D 2220/36* (2013.01); *F05D 2250/283* (2013.01); *F05D 2260/36* (2013.01)

(58) Field of Classification Search
CPC .......... F01D 25/10; F01D 5/3007; F01D 5/32; F01D 5/323; F01D 5/326; F01D 25/02; F04D 29/584; F04D 29/5853; F05D 2250/283; F02C 7/047; B64D 15/12; B64D 15/14; B64D 2033/0233
See application file for complete search history.

(56) References Cited

U.S. PATENT DOCUMENTS

| 2,552,075 | A | * | 5/1951 | Van Daam | B64D 15/12 244/134 D |
|---|---|---|---|---|---|
| 7,766,623 | B2 | | 8/2010 | Chou et al. | |
| 8,517,681 | B2 | | 8/2013 | Naka et al. | |
| 8,622,710 | B2 | | 1/2014 | Rindt et al. | |
| 8,745,990 | B2 | | 6/2014 | Burkholder et al. | |
| 8,803,703 | B2 | | 8/2014 | Mitchell et al. | |
| 8,899,917 | B2 | | 12/2014 | Bajusz et al. | |
| 9,039,379 | B2 | | 5/2015 | Radomski | |
| 9,394,805 | B2 | | 7/2016 | Hansen et al. | |

(Continued)

FOREIGN PATENT DOCUMENTS

| CN | 206487585 | | 9/2017 | | |
|---|---|---|---|---|---|
| GB | 681186 | A * | 10/1952 | ............ | F02C 7/047 |
| JP | 2019-108818 | A * | 2/2019 | ............ | F01D 5/147 |

*Primary Examiner* — Christopher Verdier
(74) *Attorney, Agent, or Firm* — Dority & Manning, P.A.

(57) ABSTRACT

A rotor blade retention system for a gas turbine engine includes a rotor blade connection component defining a slot, with the rotor blade connection component including a first set of electric leads. Furthermore, the rotor blade retention system includes a rotor blade having a root section received within the slot, with the rotor blade further including a second set of electric leads. In this respect, the first and second sets of electric leads are electrically coupled together to permit electric current to be supplied to the rotor blade.

20 Claims, 5 Drawing Sheets

(56) References Cited

U.S. PATENT DOCUMENTS

| | | | |
|---|---|---|---|
| 9,482,208 B2 | 11/2016 | Loewe et al. | |
| 2014/0078693 A1* | 3/2014 | Feeney | H05B 3/34 156/60 |
| 2020/0386159 A1* | 12/2020 | Mizuno | F04D 19/00 |

* cited by examiner

ROTOR BLADE RETENTION SYSTEM FOR A GAS TURBINE ENGINE

FIELD

The present subject matter relates to gas turbine engines and, more particularly, to rotor blades of a gas turbine engine.

BACKGROUND

A turbofan engine typically includes a fan, a nacelle, and a core gas turbine engine positioned within the nacelle. During operation of the turbofan, the core gas turbine engine drives or otherwise rotates the rotor blades of the fan relative to the nacelle. The rotation of the rotor blades, in turn, generates a flow of pressurized air, which may support the operation of the core gas turbine and/or be used as propulsive thrust for propelling an aircraft.

During operation in cold climates/conditions, ice may form on the rotor blades of the fan. Buildup of ice on the rotor blades may negatively affect the operation of the turbofan. To remove this ice, the pilot typically executes a de-icing procedure that includes rotating the fan rotor blades at a high velocity. While this procedure works well on most turbofans, some turbofans are unable to rotate at a sufficient velocity to de-ice the fan rotor blades.

Accordingly, an improved system for de-icing a rotor blade of a gas turbine engine would be welcomed in the technology.

BRIEF DESCRIPTION

Aspects and advantages of the invention will be set forth in part in the following description, or may be obvious from the description, or may be learned through practice of the invention.

In one aspect, the present subject matter is directed to a rotor blade retention system for a gas turbine engine. The rotor blade retention system includes a rotor blade connection component defining a slot, with the rotor blade connection component including a first set of electric leads. Furthermore, the rotor blade retention system includes a rotor blade having a root section received within the slot, with the rotor blade further including a second set of electric leads. In this respect, the first and second sets of electric leads are electrically coupled together to permit electric current to be supplied to the rotor blade.

In another aspect, the present subject matter is directed to a gas turbine engine. The gas turbine engine includes a fan, a compressor section, and a turbine section. Furthermore, the gas turbine engine includes a rotor blade connection component positioned within one of the fan, the compressor section, or the turbine section. As such, the rotor blade connection component defines a slot, with the rotor blade connection component including a first set of electric leads. Additionally, the gas turbine engine includes a rotor blade positioned within the one of the fan, the compressor section, or the turbine section. In this respect, the rotor blade includes a root section received within the slot, with the rotor blade further including a second set of electric leads. The first and second sets of electric leads are electrically coupled together to permit electric current to be supplied to the rotor blade.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
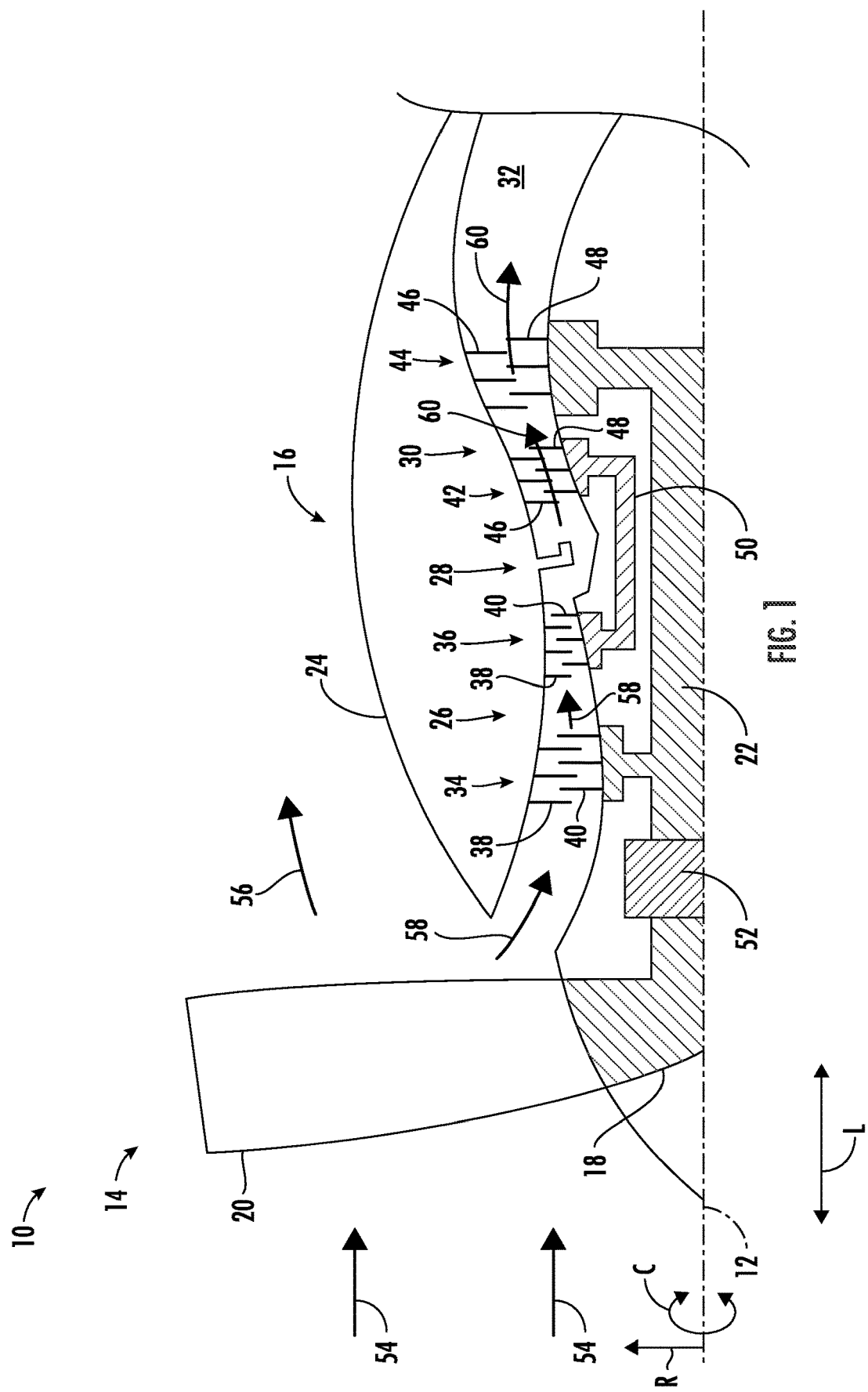
FIG. 1 is a schematic cross-sectional view of one embodiment of a gas turbine engine.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

Furthermore, the terms "upstream" and "downstream" refer to the relative direction with respect to fluid flow in a fluid pathway. For example, "upstream" refers to the direction from which the fluid flows, and "downstream" refers to the direction to which the fluid flows.

Additionally, the terms "low," "high," or their respective comparative degrees (e.g., lower, higher, where applicable) each refer to relative speeds within an engine, unless otherwise specified. For example, a "low-pressure turbine"

operates at a pressure generally lower than a "high-pressure turbine." Alternatively, unless otherwise specified, the aforementioned terms may be understood in their superlative degree. For example, a "low-pressure turbine" may refer to the lowest maximum pressure turbine within a turbine section, and a "high-pressure turbine" may refer to the highest maximum pressure turbine within the turbine section.

In general, the present subject matter is directed to a rotor blade retention system for a gas turbine engine. More specifically, the rotor blade retention system includes a rotor blade connection component (e.g., a rotor disk) defining a slot, such as a dovetail slot. Furthermore, the rotor blade retention system includes a rotor blade having a root section received within the slot and an airfoil section extending outward from the root section in a radial direction of the engine. In some embodiments, the rotor blade retention system includes a longitudinal retention member configured to prevent longitudinal movement of the root section within the slot and a radial biasing member configured to bias the root section outward in the radial direction. Additionally, in one embodiment, the rotor blade connection component and the rotor blades are positioned within a fan of the gas turbine engine.

The disclosed rotor blade retention system permits electric current to be supplied to the rotor blade. Specifically, in several embodiments, the rotor blade connection component includes a first set of electric leads. Moreover, in several embodiments, the rotor blade includes a second set of electric leads electrically coupled to the first set of electric leads. For example, the first and second sets of electric leads may be removably electrically coupled via suitable electric components (e.g., contacts, leads, and/or connectors) positioned on and/or within the longitudinal retention member or the radial biasing member. In this respect, the disclosed rotor blade retention system allows electric current to be supplied to the airfoil section (e.g., a metallic leading-edge portion) of the rotor blade. Such electric current may be used to heat the airfoil, thereby preventing ice from accumulating on the rotor blade (i.e., anti-icing) or removing ice that has already accumulated on the rotor blade (i.e., de-icing). As such, the rotor blade retention system allows for anti-icing and de-icing of fan blades on turbofans that are unable to rotate at a sufficiently high velocity to de-ice.

Referring now to the drawings, FIG. 1 is a schematic cross-sectional view of one embodiment of a gas turbine engine 10. In the illustrated embodiment, the engine 10 is configured as an open rotor or unducted turbofan engine. However, in alternative embodiments, the engine 10 may be configured as a closed rotor or ducted turbofan engine, a turbojet engine, a turboprop engine, a turboshaft gas turbine engine, or any other suitable type of gas turbine engine.

As shown in FIG. 1, the engine 10 defines a longitudinal direction L, a radial direction R, and a circumferential direction C. In general, the longitudinal direction L extends parallel to a longitudinal centerline 12 of the engine 10, the radial direction R extends orthogonally outward from the longitudinal centerline 12, and the circumferential direction C extends generally concentrically around the longitudinal centerline 12.

In general, the engine 10 includes a fan 14 and a core engine 16 extending along the longitudinal centerline 12. More specifically, the fan 14 may include a fan rotor 18 and a plurality of fan rotor blades 20 (one is shown) coupled to the fan rotor 18. In this respect, the fan rotor blades 20 are spaced apart from each along the circumference of the fan rotor 18 and extend outward from the rotor 18. Moreover, the core engine 16 may be positioned downstream from the fan 14 along the longitudinal centerline 12. As shown, the core engine 16 is rotatably coupled to the fan rotor 18 via a low-pressure (LP) shaft 22, thereby permitting the core engine 16 to rotate the fan 14. In the illustrated embodiment, the engine 10 has an open rotor configuration. However, in alternative embodiments, the engine 10 may have a closed rotor configuration in which a nacelle (not shown) surrounds the fan 14 and the core engine 16.

In several embodiments, the core engine 16 includes a nacelle or outer casing 24 surrounding various components of the core engine 16. More specifically, the nacelle 24 generally surrounds or encases, in serial flow order, a compressor section 26, a combustion section 28, a turbine section 30, and an exhaust section 32. For example, in some embodiments, the compressor section 26 may include a low-pressure (LP) compressor 34 and a high-pressure (HP) compressor 36 positioned downstream from the LP compressor 34 along the longitudinal centerline 12. Each compressor 34, 36 may, in turn, include one or more rows of stator vanes 38 interdigitated with one or more rows of compressor rotor blades 40. Moreover, in some embodiments, the turbine section 30 includes a high-pressure (HP) turbine 42 and a low-pressure (LP) turbine 44 positioned downstream from the HP turbine 42 along the longitudinal centerline 12. Each turbine 42, 44 may, in turn, include one or more rows of stator vanes 46 interdigitated with one or more rows of turbine rotor blades 48.

Additionally, the engine 10 includes the low-pressure (LP) shaft 22 and a high pressure (HP) shaft 50 positioned concentrically around the LP shaft 22. In such embodiments, the HP shaft 50 rotatably coupled the rotor blades 48 of the HP turbine 42 and the rotor blades 40 of the HP compressor 36 such that rotation of the HP turbine rotor blades 48 rotatably drives HP compressor rotor blades 40. As shown, the LP shaft 22 is directly coupled to the rotor blades 48 of the LP turbine 44 and the rotor blades 40 of the LP compressor 34. Furthermore, the LP shaft 22 is coupled to the fan 14 via a gearbox 52. In this respect, the rotation of the LP turbine rotor blades 48 rotatably drives the LP compressor rotor blades 40 and the fan blades 102.

In several embodiments, the engine 10 may generate thrust to propel an aircraft. More specifically, during operation of the engine 10, the fan 14 pressurizes incoming air (indicated by arrows 54). In this respect, a first portion (indicated by arrow 56) of the pressurized air 54 flows around the nacelle 24 (i.e., external to the nacelle 24) toward the rear of the engine 10. Conversely, a second portion (indicated by arrows 58) of the air 54 is directed into the compressor section 26 of the core engine 16. The second portion 58 of the air 54 first flows through the LP compressor 34 in which the rotor blades 40 therein progressively compress the second portion 58 of the air 54. Next, the second portion 58 of the air 54 flows through the HP compressor 36 in which the rotor blades 40 therein continue progressively compressing the second portion 58 of the air 54. The compressed second portion 58 of the air 54 is subsequently delivered to the combustion section 28. In the combustion section 28, the second portion 58 of the air 54 mixes with fuel and burns to generate high-temperature and high-pressure combustion gases 60. Thereafter, the combustion gases 60 flow through the HP turbine 42 in which the HP turbine rotor blades 48 extract a first portion of kinetic and/or thermal energy therefrom. This energy extraction rotates the HP shaft 50, thereby driving the HP compressor 36. The combustion gases 60 then flow through the LP turbine 44 in which the LP turbine rotor blades 48 extract a second portion of kinetic and/or thermal energy therefrom. This energy extraction rotates the LP shaft 22, thereby driving the LP compressor 34 and the fan 14 via the gearbox 52. In other embodiments, the LP shaft 22 may directly drive the fan 14 (i.e., the engine 10 does not include the gearbox 52). The combustion gases 60 then exit the core engine 16 through the exhaust section 32.

The configuration of the gas turbine engine 10 described above and shown in FIG. 1 is provided only to place the present subject matter in an exemplary field of use. Thus, the present subject matter may be readily adaptable to any manner of gas turbine engine configuration, including other types of aviation-based gas turbine engines, marine-based gas turbine engines, and/or land-based/industrial gas turbine engines.

Figure 2:
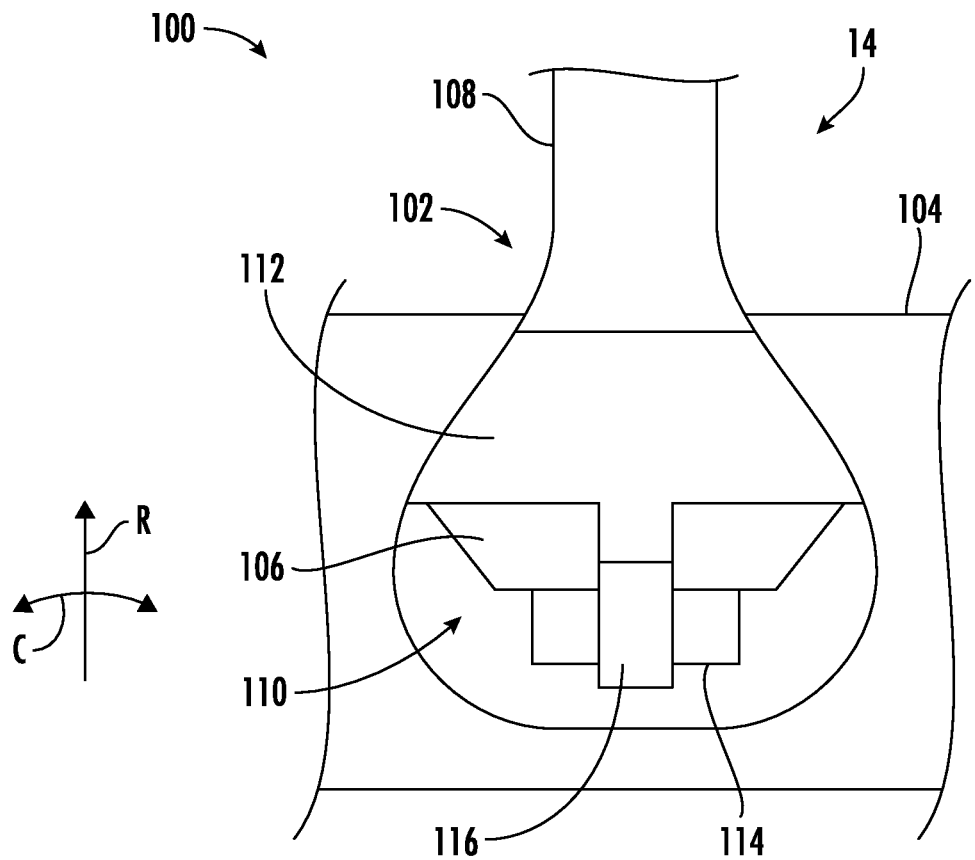
FIG. 2 is a front view of one embodiment of a rotor blade retention system for a gas turbine engine.

FIG. 2 is a front view of one embodiment of a rotor blade retention system 100 for a gas turbine engine. In general, the rotor blade retention system 100 will be discussed in the context of a fan rotor blade of the gas turbine engine 10. However, the disclosed rotor blade retention system 100 may be implemented within any rotor blade (e.g., a compressor rotor blade) having any other suitable configuration.

As shown in FIG. 2, the rotor blade retention system 100 includes a rotor blade 102 and a rotor blade connection component 104. For example, in one embodiment, the rotor blade 102 may be incorporated into the gas turbine engine 10 in place of one or more the fan rotor blades 20. In general, the rotor blade connection component 104 is configured to couple the rotor blade 102 to a shaft (e.g., the LP shaft 22) of the engine 10. Thus, rotation of the shaft rotates the rotor blade 102 about the longitudinal centerline 12. Specifically, in several embodiments, the rotor blade 102 includes a root section 106 and an airfoil section 108 extending outward from the root section 106 in the radial direction R. Moreover, the rotor blade retention component 104 defines a slot 110 configured to receive a root section 106. For example, in the illustrated embodiment, the slot 110 is configured as a dovetail slot (e.g., a longitudinal dovetail slot). In such an embodiment, the dovetail shape of the slot 110 prevents the root section 106 from exiting the slot 110 during rotation. Additionally, in some embodiments, the rotor blade connection component 104 may be configured as a rotor disk of the fan 14. However, in alternative embodiments, the rotor blade connection component 104 may be configured as a trunnion. Although only a single slot 110 is shown in FIG. 2, the rotor blade connection component 104 may define several slots 110 arranged around the component 104 in the circumferential direction C, with each slot 110 configured to receive the root section 106 of one of the fan blades 102.

In several embodiments, the rotor blade retention system 100 includes a longitudinal retention member 112. In general, the longitudinal retention member 112 is configured to prevent movement of the root section 106 within the slot 110 along the longitudinal direction L (which, in FIG. 2, is into and out of the page). As such, the longitudinal retention member 112 may be coupled to the root section 106 and the rotor blade connection component 104.

Moreover, in several embodiments, the rotor blade retention system 100 includes a radial biasing member 114. In general, the radial biasing member 114 is configured to bias the root section 106 of the rotor blade 102 outward in the radial direction R. Such biasing maintains contact between the root section 106 and the rotor blade connection component 104 when the fan 14 is not rotating. In the illustrated embodiment, the radial biasing member 114 is configured as a radial spring. However, in alternative embodiments, the radial biasing member 114 may be configured as any other suitable structure configured to bias the root section 106 of the rotor blade 102 outward in the radial direction R. Additionally, in some embodiments, the rotor blade retention system 100 includes a connection member 116 that couples the radial biasing member 114 to the longitudinal retention member 112.

Figure 3:
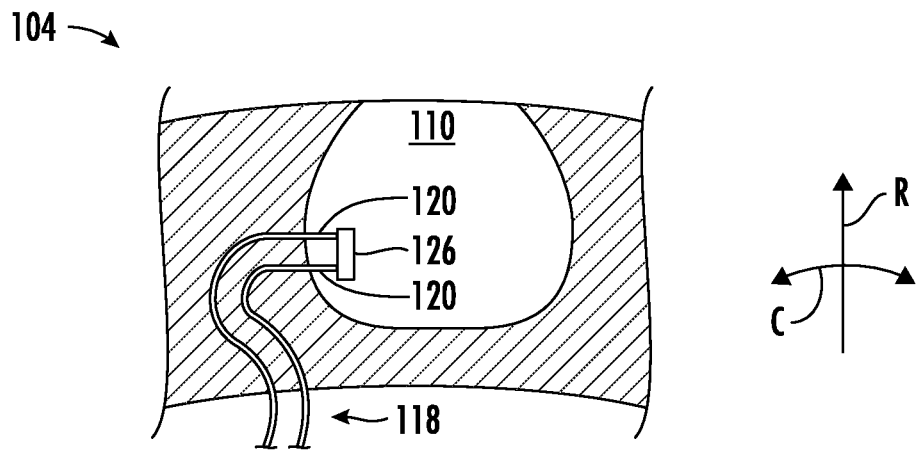
FIG. 3 is a cross-sectional view of one embodiment of a rotor blade connection component of a rotor blade of a gas turbine engine, illustrating a first set of electric leads partially positioned within a lot defined by the rotor blade connection component.
Figure 4:
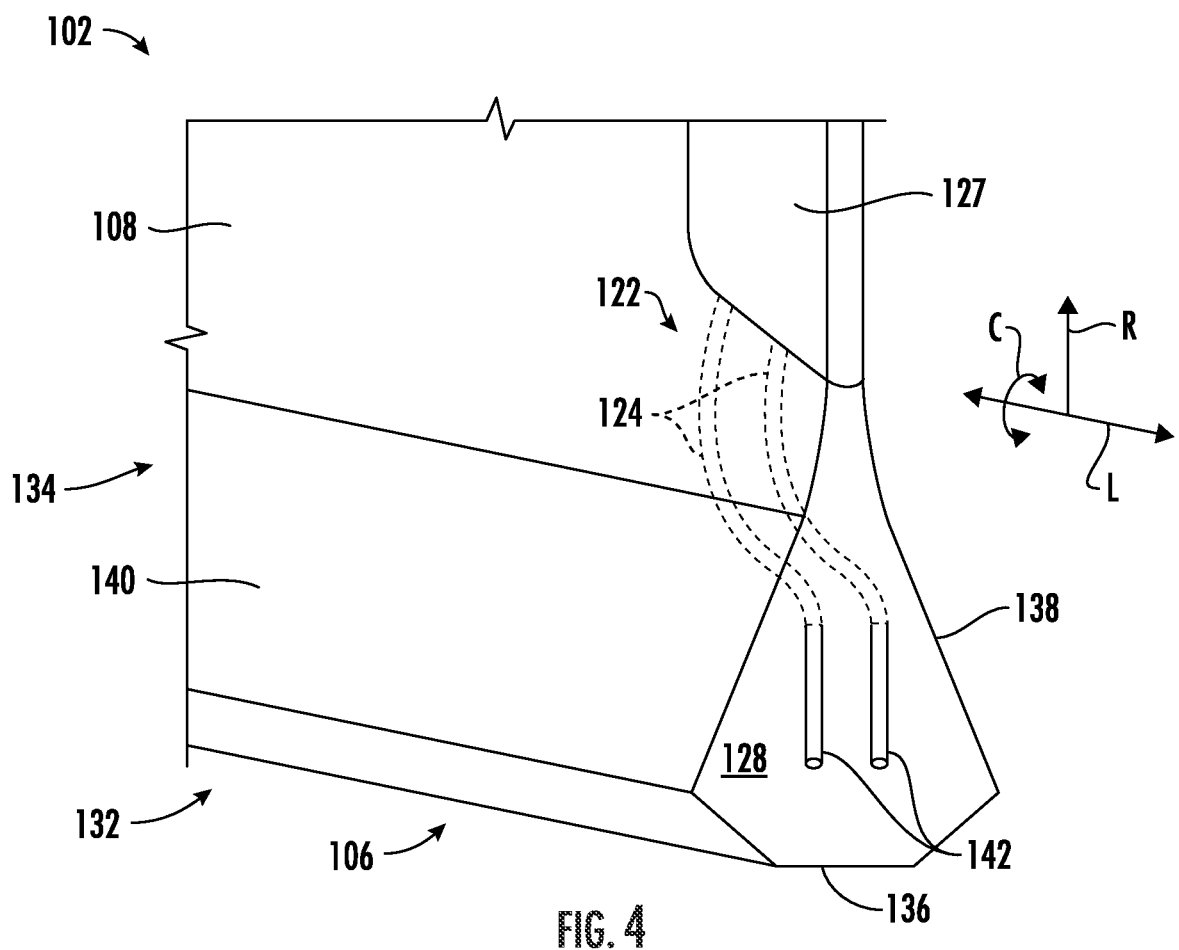
FIG. 4 is a partial perspective view of one embodiment of a rotor blade for a gas turbine engine, illustrating a second set of electric leads having a set of contacts position on an upstream surface of a root section of the rotor blade.

Referring now to FIGS. 3 and 4, in accordance with aspects of the present subject matter, the disclosed rotor blade retention system 100 includes electric leads that permit electric current to be supplied to the rotor blade 102. For example, such electric current may be used to heat a portion of the rotor blade 102 (e.g., a metallic portion of an otherwise composite rotor blade), thereby de-icing the rotor blade 102. As such, the disclosed rotor blade retention system 100 allows for anti-icing and/or—de-icing of fan blades 102 on turbofans or other gas turbine engines that are unable to rotate at a sufficiently high velocity to de-ice.

As shown in FIG. 3, in several embodiments, the rotor blade connection component 104 includes a first set 118 of electric leads 120. In some embodiments, the first set 118 of electric leads 120 is at least partially positioned within the slot 110 defined by the rotor blade connection component 104. Moreover, the first set 118 of electric leads 120 is electrically coupled to a suitable current/power source (not shown), such as battery(ies) or an alternator/generator. As will be described below, the first set 118 of electric leads 120 is electrically coupled to a second set 122 of electric leads 124 (FIG. 4) positioned on the rotor blade 102. As such, in one embodiment, the first set 118 of electric leads 120 includes an electric connector or plug 126.

The first and second sets 118, 122 of electric leads 120, 124 may include any suitable electric leads. For example, in several embodiments, the first and second sets 118, 122 of electric leads 120, 124 may include a positive lead and a negative lead.

Additionally, the electric leads 120, 124 may correspond to any suitable structure suitable for transmitting electric current. For example, in several embodiments, the electric leads 120, 124 may be suitable wires.

FIG. 4 is a partial perspective view of one embodiment of the rotor blade 102. As mentioned above, the rotor blade 102 includes an airfoil section 108. In several embodiments, the rotor blade 102 is formed from a composite material. As such, the airfoil section 108 may include a metallic portion heated by the electric current supplied to the rotor blade 102 that facilitates de-icing of the blade 102. For example, in the illustrated embodiment, the rotor blade 102 includes a metallic leading-edge portion 127. As will be described below, the electric current may heat the metallic leading-edge portion 127, thereby melting ice formed on the blade 102.

Furthermore, as mentioned above, the rotor blade 102 includes a root section 106. As shown in FIG. 4, the root section 106 extends along the longitudinal, radial and circumferential directions L, R, C. More specifically, the root section 106 extends along the longitudinal direction L between an upstream surface 128 of the root section 106 and a downstream surface 130 (FIG. 7) of the root section 106. Moreover, the root section 106 extends along the radial direction R between an inner end 132 of the root section 106 and an outer end 134 of the root section 106, with an inner surface 136 of the root section 106 positioned at the inner end 132. The outer end 134 of the root section 106, in turn, couples to the airfoil section 108. Additionally, the root section 106 extends along a circumferential direction C between a first side surface 138 and a second side surface 140.

Moreover, as mentioned above, the rotor blade 102 includes the second set 122 of electric leads 124, which are electrically coupled to the first set 118 of electric leads 120. Specifically, in several embodiments, each electric lead 124 extends from an associated contact 142 to the metallic leading-edge portion 127. As shown in FIG. 4, in some embodiments, the contacts 142 are positioned on the upstream surface 128 of the root section 106. As will be described below, in such embodiments, the contacts 142 are electrically coupled to the first set 118 of electric leads 120 via electrical components positioned on the longitudinal retention member 112. In other embodiments, the contacts 142 are positioned on the inner surface 136 of the root section 106. For example, the first and second sets 118, 122 of electric leads 120, 124 may be removably electrically coupled together. However, in alternative embodiments, the contacts 142 may be positioned on any other suitable surface of the root section 106.

Figure 5:
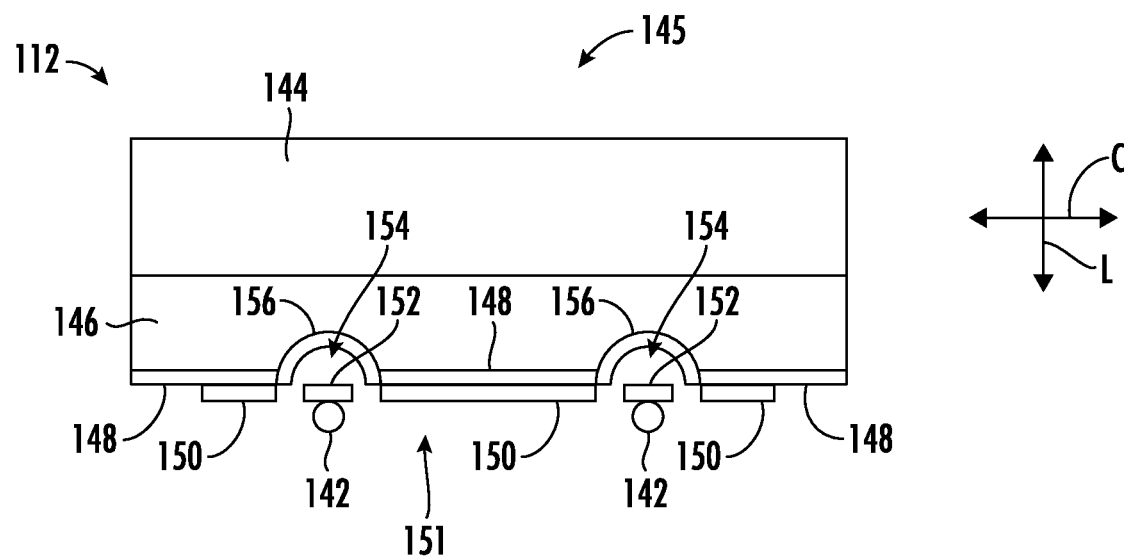
FIG. 5 is a top view of one embodiment of a longitudinal retention member suitable for use in the rotor blade retention system shown in FIG. 2.
Figure 6:
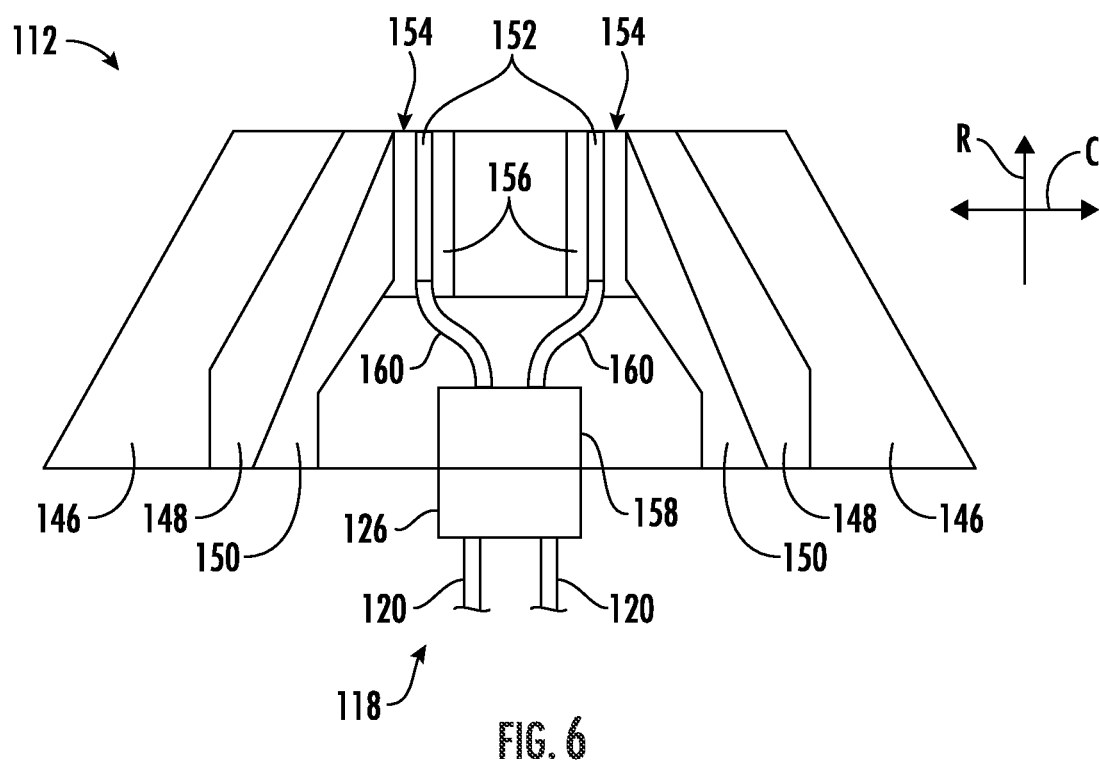
FIG. 6 is a rear view of the longitudinal retention member shown in FIG. 5.

FIGS. 5 and 6 are differing views of one embodiment of the longitudinal retention member 112. Specifically, FIG. 5 is a top view of the longitudinal retention member 112. Furthermore, FIG. 6 is a rear or downstream view of the longitudinal retention member 112.

As shown, in some embodiments, the longitudinal retention member 112 may be formed from a plurality of components. Specifically, in such embodiments, the longitudinal retention member 112 includes a solid metallic portion 144 positioned at an upstream end 145 of the member 112. Moreover, the longitudinal retention member 112 includes a honeycomb metallic portion 146 directly coupled to the solid metallic portion 144. Additionally, the longitudinal retention member 112 includes a solid metallic face sheet 148 directly coupled to the honeycomb metallic portion 146. Furthermore, the longitudinal retention member 112 includes a wear pad 150 coupled to the metallic face sheet 148 and positioned at a downstream end 151 of the member 112. As such, the wear pad 150 is positioned closest to the root section 106 of the rotor blade 102 and may be in contact with the upstream surface 128 of the root section 106. However, in alternative embodiments, the longitudinal retention member 112 may have any other suitable construction. For example, in one embodiment, the longitudinal retention member 112 may be a solid metallic component.

As mentioned above, the longitudinal retention member 112 may include suitable electrical components for electrically coupling the first and second sets 118, 122 of electric leads 120, 124. Specifically, in several embodiments, the longitudinal retention member 112 includes a set of contacts 152 that engages the set of contacts 142 of the second set 122 of electric leads 124. For example, the contacts 152 may slidingly engage the contacts 142 to permit relative movement between the longitudinal retention member 112 and the root section 106 in the radial direction R. In some embodiments, each contact 152 is positioned within a notch 154 defined by honeycomb metallic portion 146 and extending in the radial direction R. In such embodiments, a ceramic insulator 156 may be positioned within each notch 154 to electrically isolate the corresponding contact 152 of the longitudinal retention member 112 from the metallic honeycomb portion 146 (e.g., to prevent grounding). Additionally, the longitudinal retention member 112 includes an electric connector 158 connected to the set of contacts 152 via electric leads 160. The electric connector 158, in turn, removably couples to the connector 126 of the first set 118 of electric leads 120.

In operation, the electrical components of the longitudinal retention member 112 allow electric current to flow between the first set 118 electric leads 120 and the second set 122 of electric leads 124. More specifically, the positive lead of the first set 118 of electric leads 124 receives electric current from a suitable current source, such as a battery(ies) or an alternator/generator. This electric current then flows through the connector 126, the connector 158, the positive lead 160, the positive contact 152, and into the positive lead of the second set 122 of electric leads 124 via the positive contact 142. The positive lead of the second set 122 of electric leads 124 then supplies the electric current to the metallic leading-edge portion 127. Such electric current may be used to heat the airfoil 108, thereby de-icing the rotor blade 102. As such, the disclosed rotor blade retention system 100 allows for de-icing of fan blades 102 on turbofans or other gas turbine engines that are unable to rotate at a sufficiently high velocity to de-ice.

Figure 7:
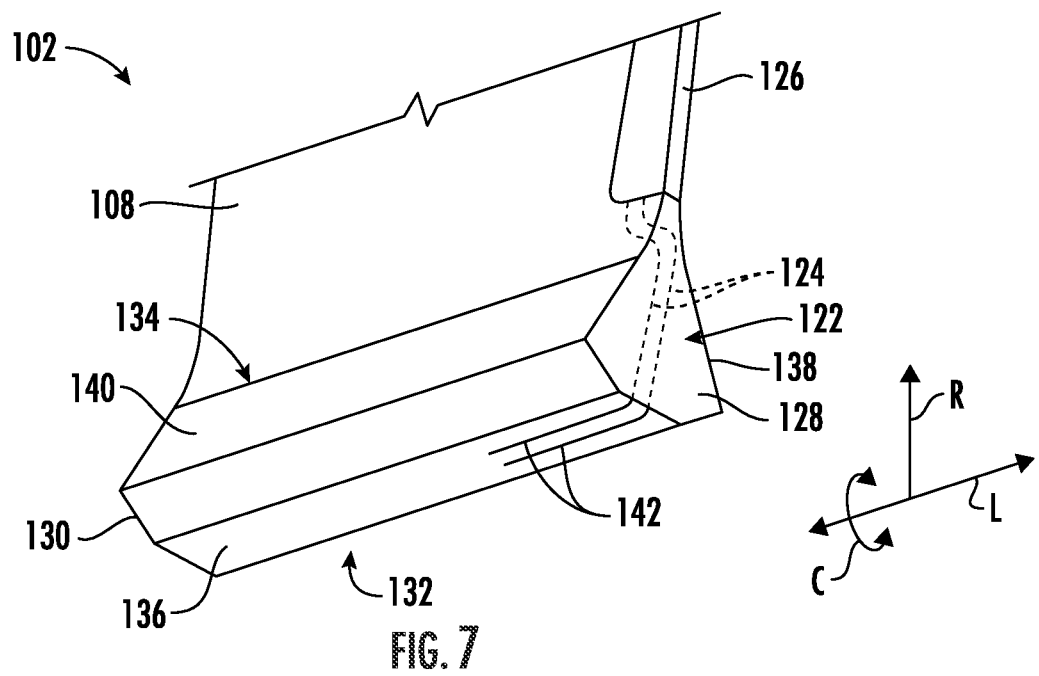
FIG. 7 is a partial perspective view of another embodiment of a rotor blade for a gas turbine engine, illustrating a second set of electric leads having a set of contacts position on an inner surface of a root section of the rotor blade.

FIG. 7 is a partial perspective view of another embodiment of the rotor blade 102. Like the embodiment of the rotor blade 102 shown in FIG. 4, the embodiment of the rotor blade 102 shown in FIG. 7 includes a root section 106 and a second set 122 of electric leads 124. Moreover, like the embodiment of the rotor blade 102 shown in FIG. 4, in the embodiment of the rotor blade 102 shown in FIG. 7, each lead 124 has a contact 142 positioned on a surface of the root section 106. However, unlike the embodiment shown in FIG. 4, in the embodiment shown in FIG. 7, the contacts 142 are positioned on the inner surface 136 of the root section 106. As will be described below, in such an embodiment, the contacts 142 are electrically coupled to the first set 118 of electric leads 120 via electrical components positioned on or within the radial biasing member 114.

Figure 8:
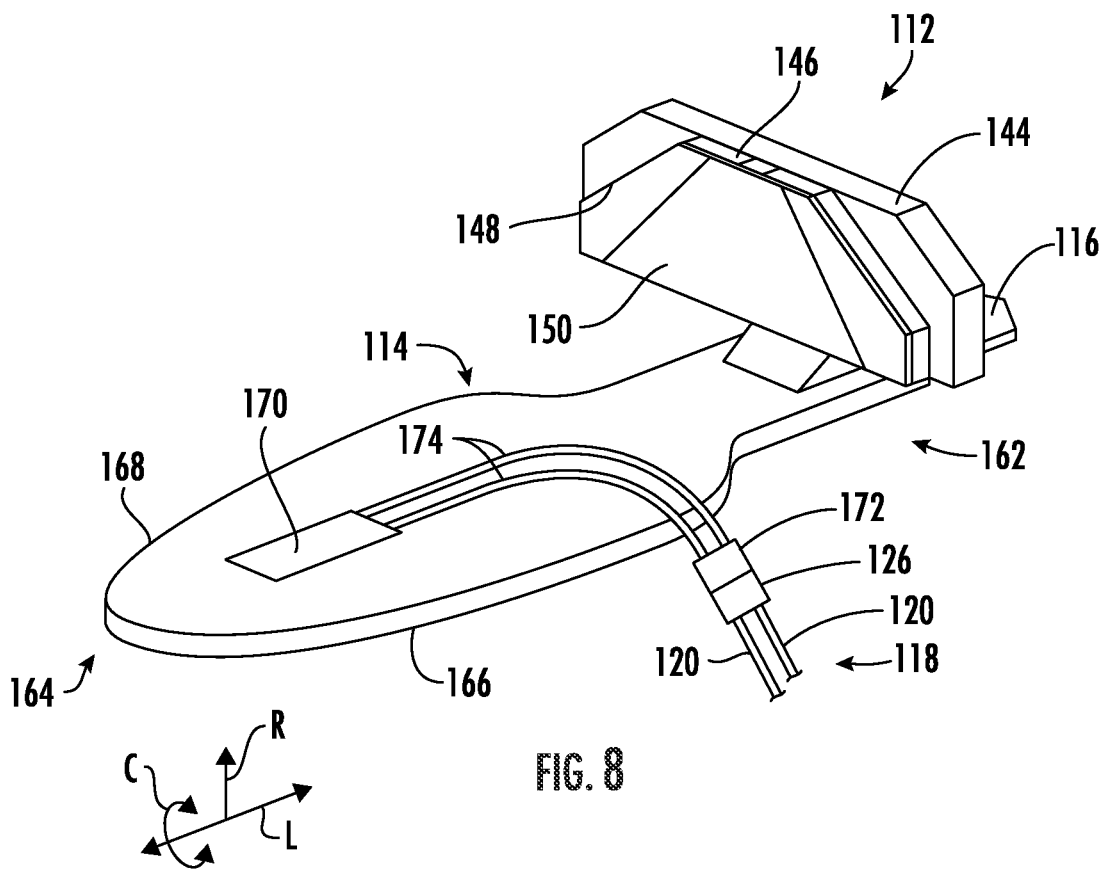
FIG. 8 is a perspective view of one embodiment of a radial biasing member suitable for use in the rotor blade retention system shown in FIG. 2.

FIG. 8 is a perspective view of one embodiment of the radial biasing member 114. Specifically, in several embodiments, the radial biasing member 114 extends along the longitudinal direction L between a forward or upstream end 162 and an aft or downstream end 164. Additionally, in such embodiments, the radial biasing member 114 extends between an inner radial surface 166 and an outer radial surface 168 in the radial direction R. As shown, the upstream end 162 of the radial biasing member 114 is coupled to the longitudinal retention member 112 via the connection member 116. Furthermore, the downstream end 164 of the radial biasing member 114 is positioned within the slot 110 such that the outer radial surface 168 of the radial biasing member 114 at its downstream end 164 is in contact within the inner surface 136 of the root section 106. In this respect, the outer radial surface 168 at the downstream end 164 is configured to exert an outward force of the root section 106, thereby biasing the root section 106 outward in the radial direction R.

As mentioned above, the radial biasing member 114 may include suitable electrical components for electrically coupling the first and second sets 118, 122 of electric leads 120, 124. Specifically, in several embodiments, the radial biasing member 114 includes a contact pad 170 positioned on the outer radial surface 168 adjacent to the downstream end 164. The contact pad 170, in turn, engages the set of contacts 142 positioned on the inner surface 136 of the root section 106. For example, the contacts 142 may slidingly engage the contact pad 170 to permit relative movement between the radial biasing member 114 and the root section 106 in the longitudinal direction L. Additionally, the radial biasing member 114 includes an electric connector 172 connected to the contact pad 170 via electric leads 174. The electric connector 172, in turn, removably couples to the connector 126 of the first set 118 of electric leads 120.

In operation, the electrical components of the radial biasing member 114 allow electric current to flow between the first set 118 electric leads 120 and the second set 122 of electric leads 124. More specifically, as mentioned above, a positive lead of the first set 118 of electric leads 120 receives electric current from a suitable current/power source, such as a battery(ies) or an alternator/generator. This electric current then flows through the connector 126, the connector 172, the positive lead 174, the contact pad 170, and into the positive lead of the second set 122 of electric leads 124 via the positive contact 142. The positive lead of the second set 122 of electric leads 124 then supplies the electric current to the metallic leading-edge portion 127. Such electric current may be used to heat the airfoil 108, thereby de-icing the rotor blade 102. As such, the disclosed rotor blade retention system 100 allows for anti-icing and/or de-icing of fan blades 102 on turbofans or other gas turbine engines that are unable to rotate at a sufficiently high velocity to de-ice.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

A rotor blade retention system for a gas turbine engine, the rotor blade retention system comprising: a rotor blade connection component defining a slot, the rotor blade connection component including a first set of electric leads; and a rotor blade including a root section received within the slot, the rotor blade further including a second set of electric leads, wherein the first and second sets of electric leads are electrically coupled together to permit electric current to be supplied to the rotor blade.

The rotor blade retention system of one or more of these clauses, wherein the first set of electric leads is at least partially positioned within the slot.

The rotor blade retention system of one or more of these clauses, wherein: the root section extends along a longitudinal direction of the gas turbine engine between an upstream surface of the root section and a downstream surface of the root section; and the second set of electric leads includes a set of contacts positioned on the upstream surface.

The rotor blade retention system of one or more of these clauses, further comprising: a longitudinal retention member configured to prevent movement of the root section within the slot in the longitudinal direction, wherein the longitudinal retention member electrically couples the first and second sets of electric leads together.

The rotor blade retention system of one or more of these clauses, wherein the longitudinal retention member includes a set of contacts that engages the set of contacts of the second set of electric leads.

The rotor blade retention system of one or more of these clauses, wherein the set of contacts of the second set of electric leads slidingly engages the set of contacts of the longitudinal retention member.

The rotor blade retention system of one or more of these clauses, wherein: the longitudinal retention member includes an electric connector connected to the set of contacts of the longitudinal retention member; and the first set of electric leads includes an electric connector removably coupled to the electric connector of the longitudinal retention member.

The rotor blade retention system of one or more of these clauses, wherein the longitudinal retention member includes a solid metallic portion, a honeycomb metallic portion coupled to the solid metallic portion, a metallic face sheet coupled to the honeycomb metallic portion, and a wear pad coupled to the metallic face sheet.

The rotor blade retention system of one or more of these clauses, wherein each contact of the set of contacts of the longitudinal retention member is positioned within a notch defined by honeycomb metallic portion.

The rotor blade retention system of one or more of these clauses, wherein the longitudinal retention member includes a ceramic insulator positioned within each notch to electrically isolate the corresponding contacts of the longitudinal retention member from the metallic honeycomb portion.

The rotor blade retention system of one or more of these clauses, wherein: the root section extends along a radial direction of the gas turbine engine between an inner surface positioned at an inner end of the root section and an outer end coupled to an airfoil section of the rotor blade; and the second set of electric leads includes a set of contacts positioned on the inner surface.

The rotor blade retention system of one or more of these clauses, further comprising: a radial biasing member positioned within the slot and configured to bias the root section outward in the radial direction, wherein the radial biasing member electrically couples the first and second sets of electric leads together.

The rotor blade retention system of one or more of these clauses, wherein the radial biasing member includes a contact pad configured to engage the set of contacts of the second set of electric leads.

The rotor blade retention system of one or more of these clauses, wherein: the radial biasing member includes an electric connector electrically coupled to the contact pad; and the first set of electric leads includes an electric connector removably coupled to the electric connector of the radial biasing member.

The rotor blade retention system of one or more of these clauses, wherein the rotor blade further includes an airfoil section extending outward from the root section in a radial direction of the gas turbine engine, the airfoil section including a metallic leading edge portion electrically coupled to the second set of electric leads.

The rotor blade retention system of one or more of these clauses, wherein the slot is a dovetail slot.

The rotor blade retention system of one or more of these clauses, wherein rotor blade connection component is a rotor disk.

A gas turbine engine, comprising: a fan; a compressor section; a turbine section; a rotor blade connection component positioned within one of the fan, the compressor section, or the turbine section, the rotor blade connection component defining a slot, the rotor blade connection component including a first set of electric leads; and a rotor blade positioned within the one of the fan, the compressor section, or the turbine section, the rotor blade including a root section received within the slot, the rotor blade further including a second set of electric leads, wherein the first and second sets of electric leads are electrically coupled together to permit electric current to be supplied to the rotor blade.

The gas turbine engine of one or more of these clauses, wherein the first and second sets of electric leads are removably electrically coupled together.

The gas turbine engine of one or more of these clauses, wherein the rotor blade connection component and the rotor blade are positioned within the fan, the rotor blade connection component is a rotor disk, and the slot is a dovetail slot.

What is claimed is:

1. A rotor blade retention system for a gas turbine engine, the rotor blade retention system comprising:
    a rotor blade connection component defining a slot, the rotor blade connection component including a first set of electric leads;
    a rotor blade including a root section received within the slot, the root section extending along a longitudinal direction of the gas turbine engine between an upstream surface of the root section and a downstream surface of the root section, the root section further extending along a radial direction of the gas turbine engine between an inner surface positioned at an inner end of the root section and an outer end coupled to an airfoil section of the rotor blade, the rotor blade further including a second set of electric leads;
    a longitudinal retention member configured to prevent movement of the root section within the slot in the longitudinal direction;
    the radial biasing member configured to bias the root section outward in a radial direction; and
    a connection member coupling the longitudinal retention member and the radial biasing member together,
    wherein one of the longitudinal retention member or the radial biasing member electrically couples the first and second sets of electric leads together to permit electric current to be supplied to the rotor blade.

2. The rotor blade retention system of claim 1, wherein the first set of electric leads is at least partially positioned within the slot.

3. The rotor blade retention system of claim 1, wherein the second set of electric leads includes a set of contacts positioned on the upstream surface.

4. The rotor blade retention system of claim 3, wherein the longitudinal retention member electrically couples the first and second sets of electric leads together.

5. The rotor blade retention system of claim 4, wherein the longitudinal retention member includes a set of contacts that engages the set of contacts of the second set of electric leads.

6. The rotor blade retention system of claim 5, wherein the set of contacts of the second set of electric leads slidingly engages the set of contacts of the longitudinal retention member.

7. The rotor blade retention system of claim 5, wherein:
    the longitudinal retention member includes an electric connector connected to the set of contacts of the longitudinal retention member; and
    the first set of electric leads includes an electric connector removably coupled to the electric connector of the longitudinal retention member.

8. The rotor blade retention system of claim 5, wherein the longitudinal retention member includes a solid metallic portion, a honeycomb metallic portion coupled to the solid metallic portion, a metallic face sheet coupled to the honeycomb metallic portion, and a wear pad coupled to the metallic face sheet.

9. The rotor blade retention system of claim 8, wherein each contact of the set of contacts of the longitudinal retention member is positioned within a notch defined by the honeycomb metallic portion.

10. The rotor blade retention system of claim 9, wherein the longitudinal retention member includes a respective ceramic insulator positioned within each respective notch to electrically isolate the corresponding contacts of the longitudinal retention member from the metallic honeycomb portion.

11. The rotor blade retention system of claim 1, wherein the second set of electric leads includes a set of contacts positioned on the inner surface.

12. The rotor blade retention system of claim 11, wherein the radial biasing member electrically couples the first and second sets of electric leads together.

13. The rotor blade retention system of claim 12, wherein the radial biasing member includes a contact pad configured to engage the set of contacts of the second set of electric leads.

14. The rotor blade retention system of claim 13, wherein:
    the radial biasing member includes an electric connector electrically coupled to the contact pad; and
    the first set of electric leads includes an electric connector removably coupled to the electric connector of the radial biasing member.

15. The rotor blade retention system of claim 1, wherein the rotor blade further includes the airfoil section extending outward from the root section in the radial direction of the gas turbine engine, the airfoil section including a metallic leading edge portion electrically coupled to the second set of electric leads.

16. The rotor blade retention system of claim 1, wherein the slot is a dovetail slot.

17. The rotor blade retention system of claim 1, wherein the rotor blade connection component is a rotor disk.

18. A gas turbine engine, comprising:
    a fan;
    a compressor section;
    a turbine section;
    a rotor blade connection component positioned within one of the fan, the compressor section, or the turbine section, the rotor blade connection component defining a slot, the rotor blade connection component including a first set of electric leads;
    a rotor blade positioned within the one of the fan, the compressor section, or the turbine section, the rotor blade including a root section received within the slot, the root section extending along a longitudinal direction of the gas turbine engine between an upstream surface of the root section and a downstream surface of the root section, the root section further extending along a radial direction of the gas turbine engine between an inner surface positioned at an inner end of the root section and an outer end coupled to an airfoil section of the rotor blade, the rotor blade further including a second set of electric leads;
    a longitudinal retention member configured to prevent movement of the root section within the slot in the longitudinal direction;
    the radial biasing member configured to bias the root section outward in a radial direction; and
    a connection member coupling the longitudinal retention member and the radial biasing member together,
    wherein one of the longitudinal retention member or the radial biasing member electrically couples the first and second sets of electric leads together to permit electric current to be supplied to the rotor blade.

19. The gas turbine engine of claim 18, wherein the first and second sets of electric leads are removably electrically coupled together.

20. The gas turbine engine of claim 18, wherein the rotor blade connection component and the rotor blade are positioned within the fan, the rotor blade connection component is a rotor disk, and the slot is a dovetail slot.

* * * * *